US010046745B2

(12) United States Patent
McGowan

(10) Patent No.: US 10,046,745 B2
(45) Date of Patent: Aug. 14, 2018

(54) CABLE-TRAVERSING TROLLEY ADAPTED FOR USE WITH IMPACT BRAKING

(71) Applicant: TruBlue LLC, Boulder, CO (US)

(72) Inventor: John McGowan, Boulder, CO (US)

(73) Assignee: TruBlue LLC, Boulder, CO (US)

( * ) Notice: Subject to any disclaimer, the term of this patent is extended or adjusted under 35 U.S.C. 154(b) by 137 days.

(21) Appl. No.: 14/664,286

(22) Filed: Mar. 20, 2015

(65) Prior Publication Data
US 2015/0266454 A1 Sep. 24, 2015

Related U.S. Application Data

(60) Provisional application No. 61/968,205, filed on Mar. 20, 2014.

(51) Int. Cl.
A63G 21/22 (2006.01)
B60T 11/04 (2006.01)
B61H 9/02 (2006.01)
F16D 63/00 (2006.01)

(52) U.S. Cl.
CPC ............ B60T 11/046 (2013.01); A63G 21/22 (2013.01); B61H 9/02 (2013.01); F16D 63/008 (2013.01)

(58) Field of Classification Search
CPC .......... B60T 7/102; B60T 11/046; B60T 7/10; A63G 21/22; A63G 21/20; F16D 63/008; B61H 9/02; B61B 7/00; B61B 12/02; A62B 1/14; E01B 25/18
USPC ........................................................ 104/113
See application file for complete search history.

(56) References Cited

U.S. PATENT DOCUMENTS

| 245,893 | A | | 8/1881 | Tunnington |
| 479,524 | A | | 7/1892 | Nicholson |
| 547,528 | A | | 10/1895 | Weaver et al. |
| 654,687 | A | | 7/1900 | Suter |
| 926,156 | A | | 6/1909 | Waterhouse et al. |
| 1,087,062 | A | | 2/1914 | Izett |
| 1,087,063 | A | | 2/1914 | Izett |
| 1,228,694 | A | | 6/1917 | Netcott |
| 1,490,619 | A | | 4/1924 | Manikowske et al. |
| 1,873,196 | A | | 8/1932 | Harris et al. |
| 1,935,711 | A | * | 11/1933 | Hecox ................ A62B 1/14 104/113 |
| 1,958,877 | A | * | 5/1934 | Yake .................. A62B 1/14 104/113 |

(Continued)

FOREIGN PATENT DOCUMENTS

DE 4237263 7/1994
EP 0131384 1/1985

(Continued)

OTHER PUBLICATIONS

PCT International Search Report and Written Opinion in International Application PCT/US2018/016475, dated Apr. 16, 2018, 16 pages.

Primary Examiner — Mark T Le

(57) ABSTRACT

A trolley for traversing a zip line includes a first load-bearing sheave rotatably mounted to one or more side plates, and a second load-bearing sheave rotatably mounted to the one or more side plates and rearward of the first sheave. The trolley also includes an anchor point on the trolley for attaching a payload. When the trolley decelerates, forces acting on the payload create a downward load on the first sheave and the second sheave.

8 Claims, 19 Drawing Sheets

(56) References Cited

U.S. PATENT DOCUMENTS

| | | | | |
|---|---|---|---|---|
| 2,812,010 | A | 11/1957 | Abdallah | |
| 3,040,678 | A * | 6/1962 | McEwen | A63G 21/22 104/112 |
| 3,070,035 | A | 12/1962 | Russo et al. | |
| 3,192,872 | A | 7/1965 | Parent | |
| 3,480,272 | A | 11/1969 | Ziebart | |
| 3,759,190 | A | 9/1973 | Harvey | |
| 4,062,293 | A | 12/1977 | Davis | |
| 4,159,113 | A | 6/1979 | Callecod | |
| 4,621,851 | A | 11/1986 | Bailey, Jr. | |
| 4,892,508 | A * | 1/1990 | Ryan | B61B 12/06 105/151 |
| 4,948,118 | A | 8/1990 | Miraglia | |
| 5,113,768 | A | 5/1992 | Brown | |
| 5,224,425 | A | 7/1993 | Remington | |
| 5,701,824 | A | 12/1997 | Johnson et al. | |
| 5,904,099 | A | 5/1999 | Danneker | |
| 5,931,100 | A | 8/1999 | Sutton et al. | |
| 6,363,858 | B1 | 4/2002 | Voirin | |
| 6,640,727 | B2 | 11/2003 | Ostrobrod | |
| 6,666,773 | B1 | 12/2003 | Richardson | |
| 6,810,818 | B2 | 11/2004 | Petzl et al. | |
| 7,381,137 | B2 | 6/2008 | Steele et al. | |
| 7,610,706 | B2 | 11/2009 | Pitcher et al. | |
| 7,624,684 | B2 | 12/2009 | Morris | |
| 7,819,066 | B2 | 10/2010 | Smith | |
| 8,336,463 | B2 | 12/2012 | Smith | |
| 8,424,460 | B2 | 4/2013 | Lerner et al. | |
| 8,601,951 | B2 * | 12/2013 | Lerner | B60B 19/10 104/112 |
| 9,033,115 | B2 | 5/2015 | Lerner | |
| 9,242,659 | B2 * | 1/2016 | Bernier | B61H 9/02 |
| 9,381,926 | B2 * | 7/2016 | Brannan | B61H 9/02 |
| 2002/0162477 | A1 | 11/2002 | Palumbo | |
| 2008/0178760 | A1 | 7/2008 | Frangos et al. | |
| 2008/0202375 | A1 | 8/2008 | Quattlebaum | |
| 2009/0223406 | A1 * | 9/2009 | Smith | A63G 21/22 104/112 |
| 2011/0083577 | A1 | 4/2011 | Tilley | |
| 2012/0031296 | A1 | 2/2012 | Smith | |
| 2015/0375758 | A1 * | 12/2015 | Strasser | A63G 21/20 105/150 |

FOREIGN PATENT DOCUMENTS

| | | |
|---|---|---|
| EP | 1386814 | 2/2004 |
| GB | 920392 | 3/1963 |
| GB | 1527238 | 10/1978 |
| WO | 2009143529 A2 | 11/2009 |

* cited by examiner

CABLE-TRAVERSING TROLLEY ADAPTED FOR USE WITH IMPACT BRAKING

RELATED APPLICATION

This application claims the benefit of U.S. Provisional Application No. 61/968,205, filed Mar. 20, 2014, which application is hereby incorporated by reference.

INTRODUCTION

Zip lines, alternatively written as "ziplines" or "zip-lines," refers to a form of entertainment in which a rider traverses a wire or other cable from one point to another. Typically, the traverse is powered by gravity, with the rider traveling from the high end of the zip line to the low end. Zip lines have become popular vacation activities and are becoming increasing common attractions at amusement parks, theme parks and vacation spots.

Growth in commercial, recreational zip lines have been significant in recent years, a trend that appears will continue for the foreseeable future. The growth of the industry has coincided with higher rider speeds, longer descents—and much greater danger and risk to participants. With demand for greater speed also comes a need for safely braking participants. In essence, demand has significantly outpaced the technology to ensure safety to riders.

Rolling trolleys are widely utilized for conveying loads from one location to another via rope, cable, track, or structural member (for example, I-beam, tube steel, steel bar etc). Historically, in order to brake a load that is travelling on such a system, a wide range of terminal braking systems have been deployed, such as gravity (a system in which an elevated finish slows a load), to compression or extension springs (a spring mounted to absorb a load), to weighted displacement systems (weights on a line), or manual belay systems. More recently, as the demand for more reliable braking systems and higher impact forces has increased, a number of mechanical braking systems have been developed to accommodate terminal braking, such as those that employ friction, pneumatic, hydraulic or magnetic braking resistance.

When braking a suspended load that is traveling at medium to high velocity, the load has a strong tendency to swing upward or shift once braking force is applied to the trolley above, often resulting in unwanted consequences such as: injuries to riders, damages to loads, damage to trolleys, damage to braking components, increased braking force due to unintended consequences (such as trolleys lifting and creating drag on cables or other components), and/or lost efficiencies (such as loads not arriving at the intended location because of irregularities in braking requiring time to retrieve the load and place to the system back into service). And while many devices and systems have been developed to provide braking force, mechanisms to constrain swing/shift have been absent.

For example, virtually all zip line rider trolleys employ multiple sheaves that engage a zip line (cable), whereby a rider is suspended below—most typically via a suspension system composed of webbing and connectors. In zip lining, it is typical for a rider to reach a high level of velocity during the ride, with the speed/momentum to be dissipated at the terminal end via some form of "impact braking", whereby the trolley above the rider impacts the brake, and the rider (load) continues their travel in an upward arc during deceleration. Without a form of constraint during this deceleration, the rider continues forward and may impact the zip line above, becoming injured by the impact. Additionally, the trolley may become displaced from the line (for example, the front sheave can lift off of the line), which can compound the problem and can lead to broken trolleys and zip line components.

FIG. 1 illustrates a zip line system 100 suitable for using the various embodiments of rider trolleys described herein. The zip line 102 may be any type of suitable cable but is most often steel. Each of the upper anchor 104 and lower anchor 106 may be a pole (as shown) or some other manmade structure (e.g., a tower, building, crane, etc.) or a natural feature such as a rock outcrop or a tree. The upper anchor 104 has a launch position for riders, illustrated as a launch or initiation platform 108 attached to the pole. Likewise, a terminal or landing platform 110 is also provided on the lower pole 106. A rider 112 is illustrated in decent hanging below a rider trolley 114. A launch mechanism 115 may be used to hold a rider trolley until the time of launch.

After launch, the rider trolley 114 traverses under gravity down the zip line 102 until the trolley 114 impacts a brake 116. Impact with the brake 116 causes the trolley 114 to decelerate so that the rider 112 stops before reaching the end of the zip line at the lower anchor 106. The brake 116 may be a brake trolley, a brake block (as shown), a spring, or other type of mechanism, typically attached to the zip line. In the embodiment of the system 100 shown, the brake 116 is attached via a redirectional pulley 118 to a braking device 120 via a brake cable 122 as shown. In some systems, the redirectional pulley 118 is anchored to a gantry 124 or other intermediate structure, although many systems use an accessory line (not shown) instead, which is a second line strung above or next to the zip line 102 to anchor components such as redirectional pulleys 118. In the system shown, the braking device 120 is a zipSTOP™ eddy current braking device although any suitable braking mechanism may be used.

In the system 100 shown, the brake 116 is provided with a retrieval line 126. In systems where the brake 116 attaches to the rider trolley 114 upon impact, the retrieval line 126 can be used to pull a rider trolley 114 to the landing platform 110 in the event that the rider 112 does not have enough momentum to reach the platform 110 under gravity alone. This may occur for any number of reasons such as light riders relative to the brake resistance, poorly functioning rider trolley, and/or excessive headwinds.

A secondary brake, sometimes also referred to as an emergency arrest device (EAD) may also be provided (not shown). The EAD may take the form of a second brake or some other device to prevent injury to the rider due to impact with the lower anchor in case of a failure in the primary braking system shown.

For clarity, the phrases "zip line system" or "system" will be used when referring to all the components generally and zip line 102 will be used to refer to the actual cable. Likewise, the phrase "trolley" and "rider trolley" will be used for the rider trolley 114 while the phrase "brake trolley" shall refer only to a trolley used a brake 116 adapted to cause braking to the rider trolley 114.

Many existing zip line rider trolley designs employ a fixed handle that is attached to the trolley, in which a rider can hold onto grips to control his/her orientation during a descent. Such a handle/grip has two advantages: a.) it allows the rider to arrive at the terminal platform facing forwards (this decreases the odds of a riders head from impacting the cable during deceleration swing as may more likely occur when a rider is facing backward during breaking), and b.) the handle minimizes the possibilities of a riders being injured due to impact with braking components (for example, the likelihood that a hand or arm may be caught between trolley and brake mechanism is reduced because the hands are not free to move) during deceleration. However, use of a handle may result in significantly increased uplift forces on the trolley during deceleration, causing problems with brake interface (sometimes dramatically augmenting deceleration and rider swing), and damage to equipment, as is discussed in greater detail below.

FIG. 2 is two views of an existing rider trolley 200 used in zip line systems. In this design, the trolley has two sheaves 202 that rotate around pivot pins (not shown). The sheaves 202 are located between two opposing side plates 204 as shown. The side plates 204 are wide enough apart to accommodate the zip line 208 and to allow the rider trolley 200 to be placed on (installed) and removed from the zip line 208. An anchor point in the form of an aperture 206 is provided in each side plate 204 for attaching a cable connected to a rider or other payload to the trolley. When an anchor coupling, such as a carabiner, is passed through the anchor points 206 of both plates 204 of a rider trolley 200 installed on a zip line 102, the carabiner may also lock the rider trolley to the zip line 208 preventing the trolley from being removed or from falling off. Because the anchor points 206, when installed on a zip line, are equidistant from the two sheaves 202, when a sufficiently heavy payload is attached in this way, the sheaves 202 are substantially equally loaded against the zip line 102 so that both sheaves 202 easily roll along the zip line.

Cable-traversing Trolley Adapted for Use with Impact Braking

Described herein are various embodiments of trolleys usable for traversing cables such as zip lines. Various embodiments have been to be particularly adapted to perform better under different circumstances or in different applications using braking including impact braking. While presented in terms of a rider trolley for use with a zip line, the reader will understand that the concepts could be adapted herein for any purpose (industrial, recreational or otherwise) that employs impact braking to slow or stop a trolley, pulley or other type of rolling or sliding load on a cable.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

Figure 1:
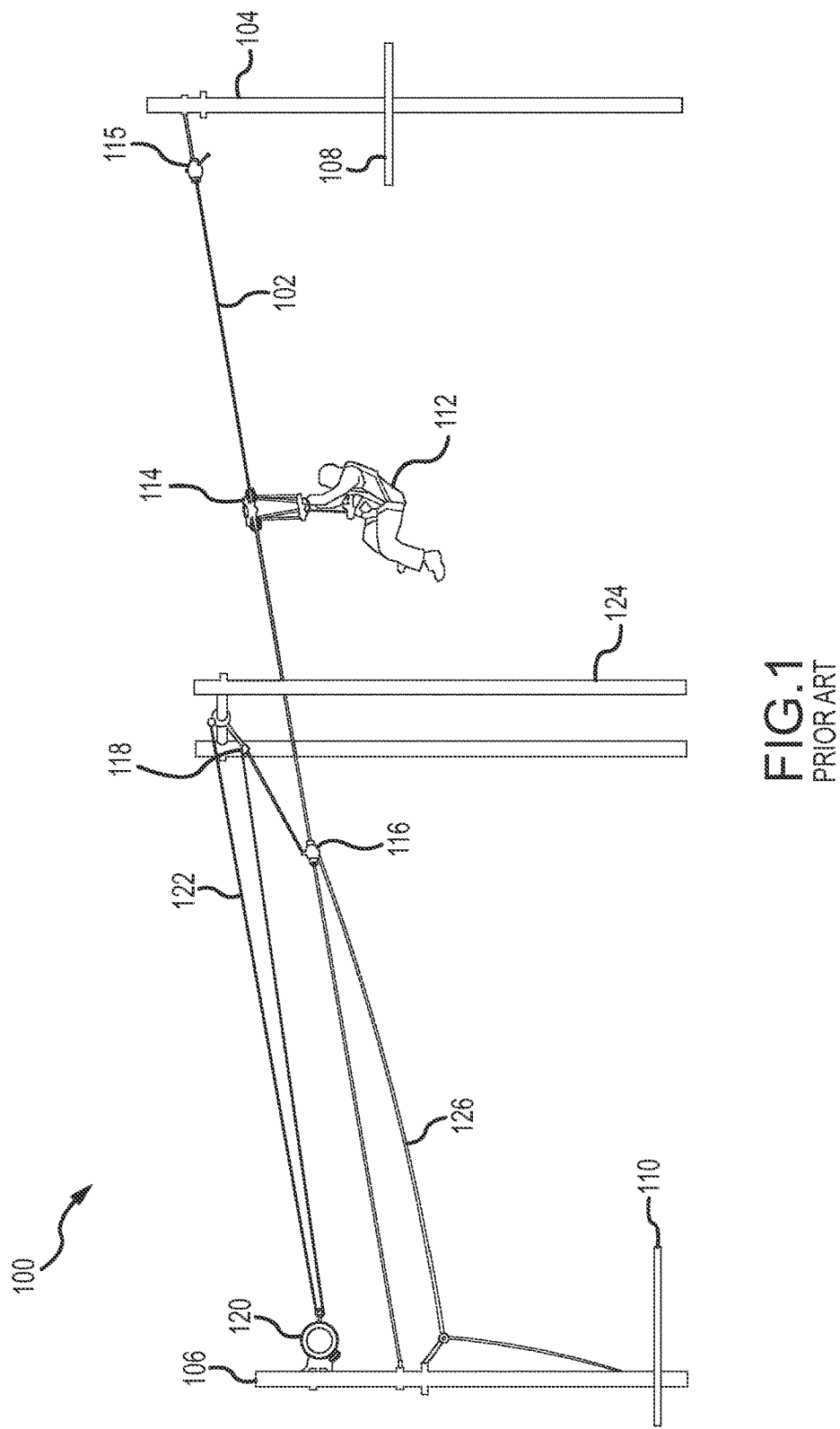
FIG. 1 illustrates a zip line system suitable for using the various embodiments of rider trolleys described herein.
Figure 2:
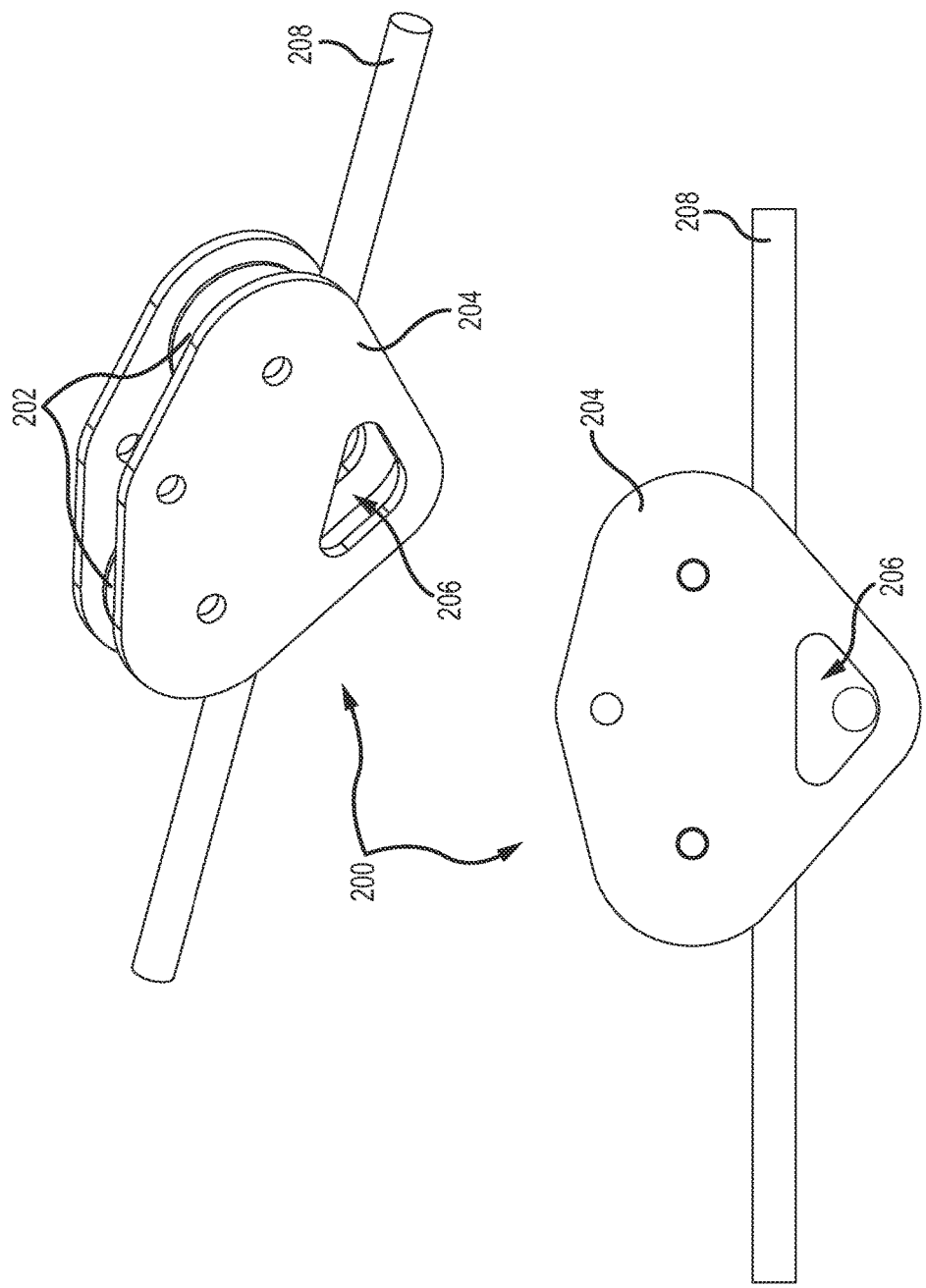
FIG. 2 is two views of an existing rider trolley used in zip line systems.
Figure 3:
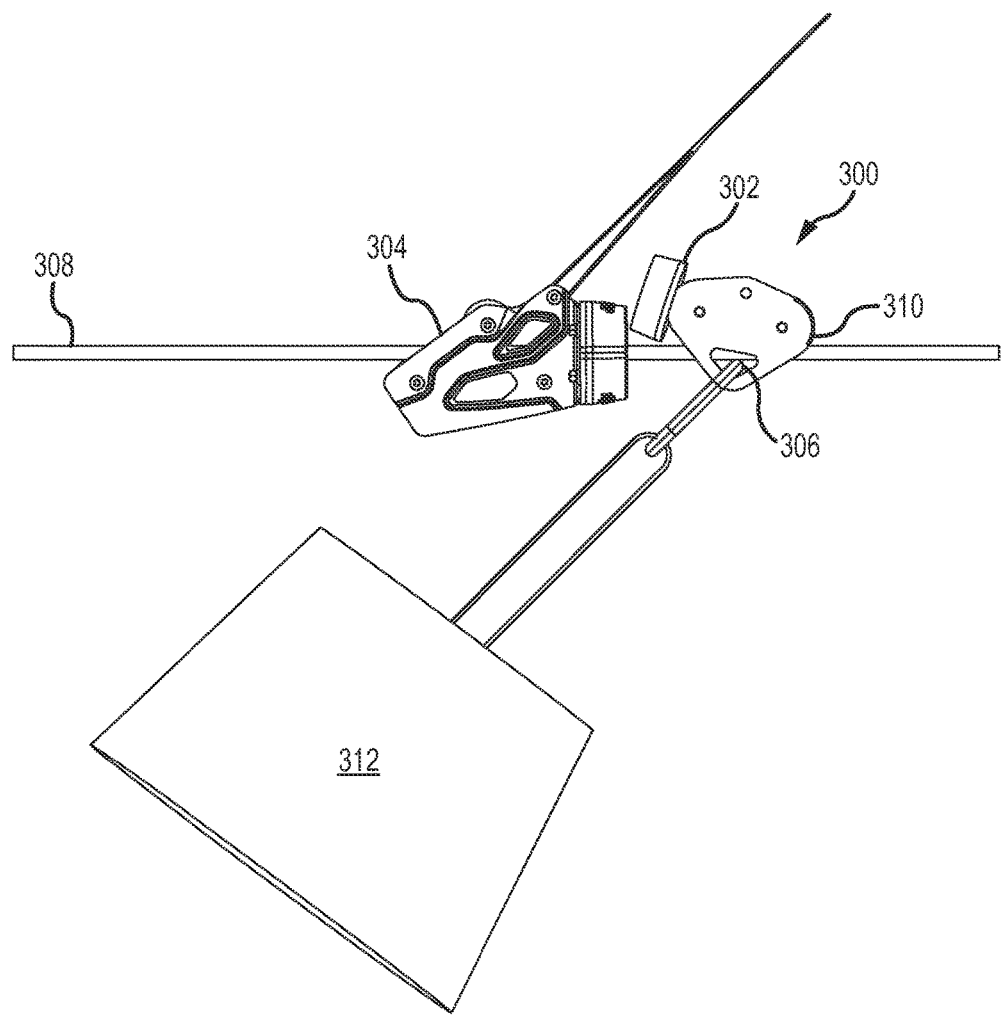
FIG. 3 illustrates one problem with existing rider trolley designs.

FIG. 3 illustrates one problem the inventor has identified with existing rider trolley designs. Existing trolley designs incorporate a load anchor or system that distributes the load relatively equally between sheaves. Such a design works well during travel down the zip line 308, especially in the absence of lateral forces that might be exerted solely on the trolley (as opposed to lateral forces exerted on the payload). With the introduction of a lateral force (impact braking, for example), however, normally equalized loads can become destabilized during the act of braking. The trolley 300 in FIG. 3 is substantially the same as that in FIG. 2, except this trolley 300 has been illustrated with a simple bumper 302 for impacting a brake trolley 304. As shown in FIG. 3, because of the location of the anchor point 306 relative to the other elements of the trolley 300, upon impact at high speed it is common for the trolley 300 to rotate upon impact with the brake 304 as shown. As illustrated, the rider trolley upon impact lifts off the zip line 308 during impact braking. In addition to creating additional uncontrollable and unintended drag, such rotation of the trolley can also cause wear or damage to the rider trolley, the brake trolley, the zip line, or the carabiner/anchor coupling.

First, it can cause a misalignment of the impact surfaces (e.g., the forward surface of the trolley bumper 302 and the impact surface of the brake trolley 304). It can also cause a misalignment of one or both of the sheaves of the trolley with the zip line 308. For example, as the leading sheave lifts off the cable the rider trolley 300 no longer tracks straight and the trolley side plates can make contact with the cable. Such misalignment can result in significant increased drag and loss of braking performance.

In addition, when such lifting occurs if the trolley 300 is provided with a back plate 310 or portion that extends over the zip line 308 when in use, this back plate 310 can make contact with the zip line 308. This creates further drag. This may also cause increased wear or even damage to the zip line 308 or the trolley 300, increasing the cost of operation of zip line system.

A further problem relates to the movement of the rider or payload due to the location of the anchor point 306 on the trolley. Upon impact, the rider trolley 300 decelerates but the payload is free to rotate about the anchor point 306. This may cause the payload 312 to pendulum in an unsafe manner as shown in FIG. 3; under extreme conditions causing riders to impact the brake, the zip line or any other nearby components of the system.

Described herein are various embodiments of trolleys usable for traversing cables such as zip lines. Various embodiments have been to be particularly adapted to perform better under different circumstances or in different applications using braking. While presented in terms of a rider trolley for use with a zip line, the reader will understand that the concepts could be adapted herein for any purpose (industrial, recreational or otherwise) that employs impact braking to slow or stop a trolley, pulley or other type of rolling or sliding load on a cable. In addition, although described in terms of zip line trolleys, the trolleys described herein could be adapted for conveying loads from one location to another via rope, cable, track, or structural member (for example, I-beam, tube steel, rail, steel bar, etc).

Figure 4:
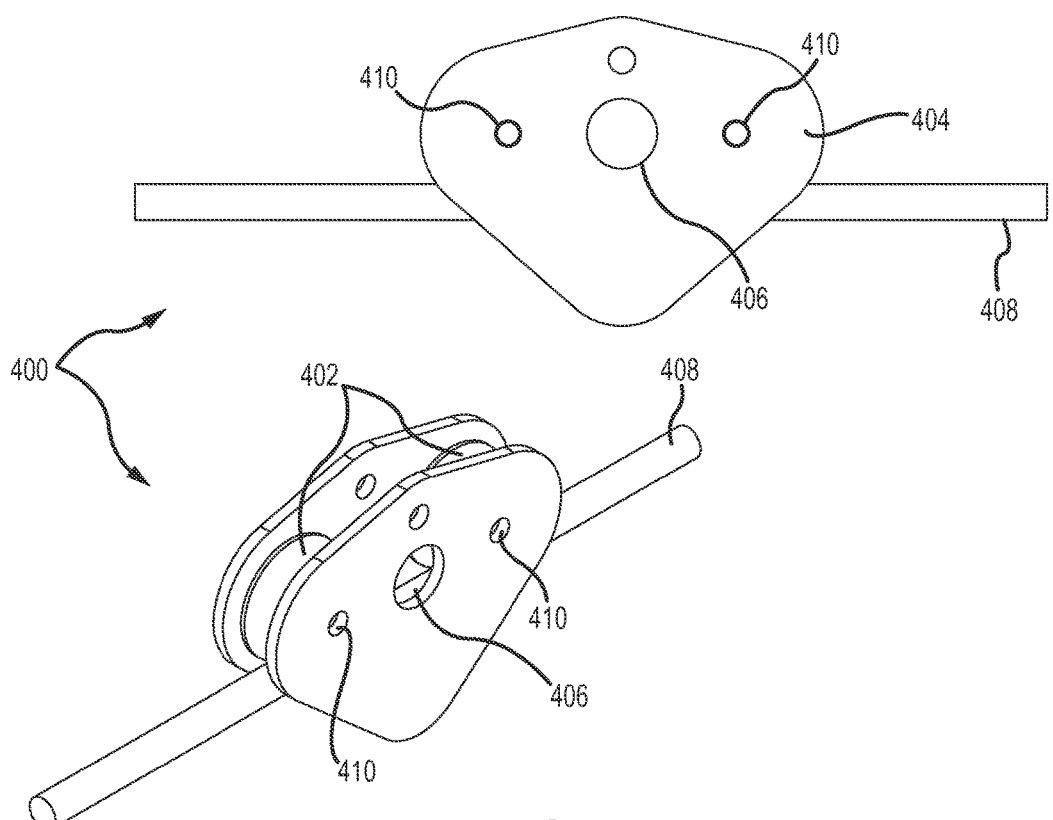
FIG. 4 illustrates an embodiment of an improved rider trolley that moves the anchor point in order minimize the lever arm upon impact braking.

FIG. 4 illustrates an embodiment of an improved rider trolley 400 that moves the anchor point 406 in order minimize the lever arm upon impact braking. In the embodiment shown, anchor points 406 in the side plates 404, instead being below the sheaves 402 and the zip line 408, are above the zip line 408 and between the sheaves 402. In the embodiment shown, the center of the anchor point 406 is in line with the center of the pivots 410 of the sheaves 402. In an alternative embodiment, the anchor point 406 is located slightly above or below the pivot location so that the anchor coupling is in line with the center of the pivots 410. As can be seen, assuming a flat impact surface perpendicular to the zip line 408, because the impact forces delivered to the rider trolley will be in line with the center of the sheaves 402 in the design shown, the lever arm force on the trolley 400 during impact braking will be reduced. In addition, because the anchor point is above the zip line 408, the forces caused by the deceleration of the payload (e.g., a rider swinging during braking), rather than causing the forward sheave to lift from the zip line, will keep the forward sheave 402 loaded on the zip line 408.

Figure 5:
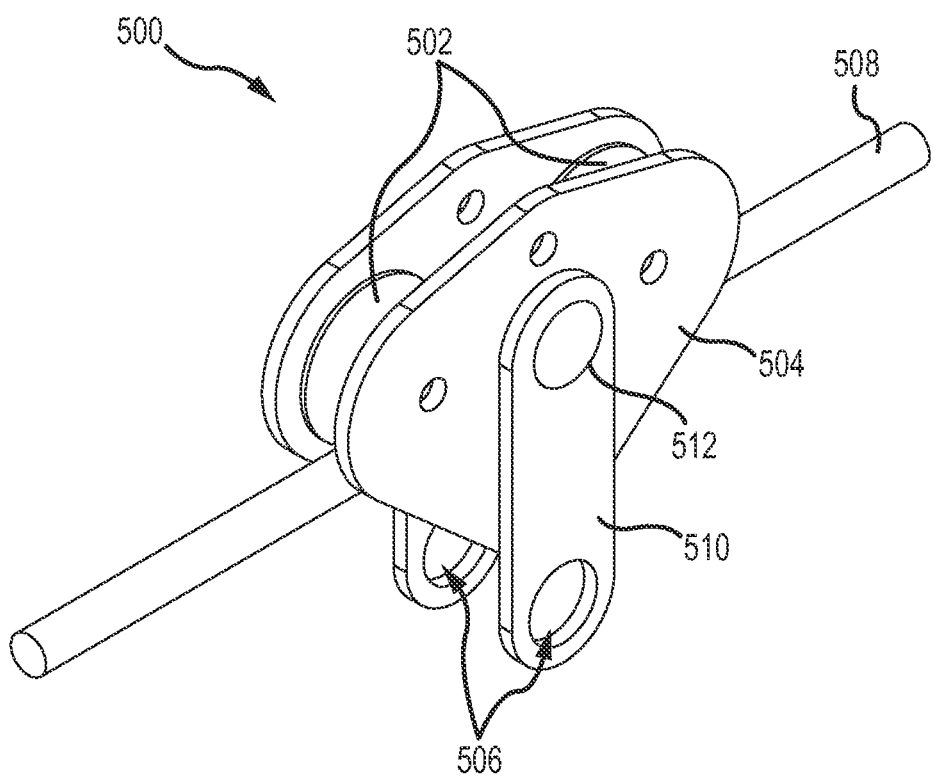
FIG. 5 illustrates an embodiment of an improved rider trolley provided with a swinging load arm in order minimize the lever arm upon impact braking.

FIG. 5 illustrates an embodiment of an improved rider trolley 500 provided with a swinging load arm in order reduce the lever arm upon impact braking. As discussed above, many existing zip line rider trolley designs employ a fixed handle but often such handles cause significant increased uplift during deceleration, causing problems with brake interface (sometimes dramatically augmenting deceleration and rider swing), and damage to equipment. The rider trolley embodiment of FIG. 5 provides some of the advantages of the fixed handle but reduces the uplifting moment.

In the embodiment shown in FIG. 5, each side plate 504 of the rider trolley 500 is provided with a rotating load arm 510 pivotably mounted to the exterior surface of the plate 504. A first end of the load arms 510 is attached to and pivots about an axle 512 located at a location in the side plate 504 above zip line 508 and between the sheaves 502 as described with respect to FIG. 4. The two load arms 510 may be independently pivotable or may be attached, such as to the axle or pivot point, so that they pivot together about the pivot point. The distal end of the load arms 510 is provided with an anchor point 506, again in the form of an aperture allowing an anchor coupling, e.g., a carabiner, to be used to attach a rider. In the embodiment shown, attachment of an anchor coupling (not shown) through both anchor points 506 in both load arms 510 prevents the rider trolley 510 from disengaging from the zip line 508. Although not shown in FIG. 5, a handle grip may be attached to one or both of the load arms 510, such as between the pivot and anchor point.

Alternative embodiments are also possible in which a single load arm 510 is used (not shown). In such an embodiment, the position of the load arm may case a secondary safety latch to engage which prevents unintentional removal of the rider trolley 500 from the zip line 508 such as that shown in FIG. 15, below.

In yet another embodiment (not shown), the load arms 510 may be independently pivotable and may be provided with interior facing bulges or pins preventing the rider trolley 500 from being removed from the zip line when the two load arms 510 are in line as shown in FIG. 5. In such an embodiment, the safety pins (not shown) may be closer to the zip line 508 than the anchor coupling 506 and thus reduce the amount of movement possible between the sheaves 502 and the zip line 508 when the rider trolley is installed and the arms 510 are in line.

Figure 6:
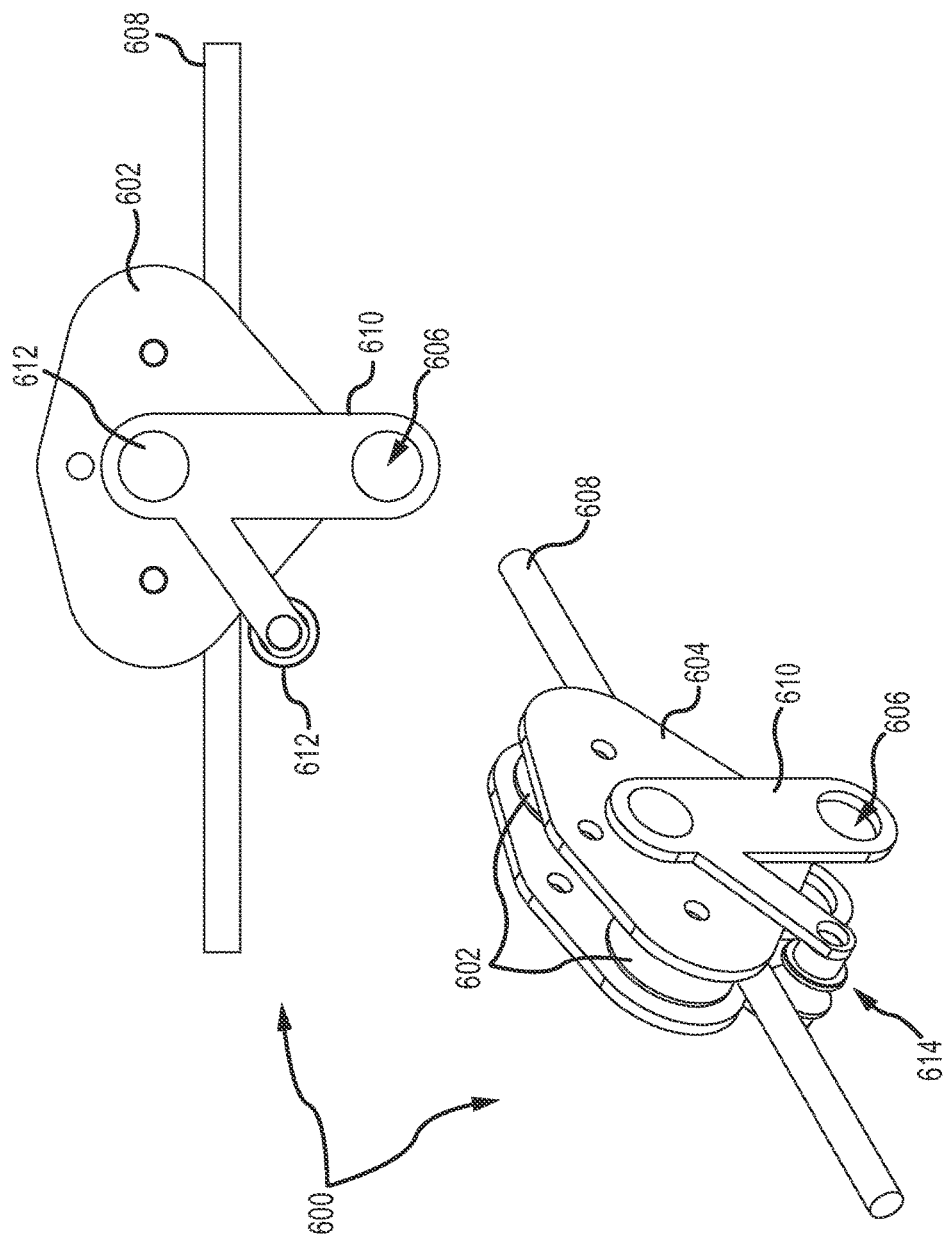
FIG. 6 illustrates yet another embodiment of an improved rider trolley provided with a swinging load arm.

FIG. 6 illustrates yet another embodiment of an improved rider trolley 600 provided with a swinging load arm 610. In the embodiment shown in FIG. 6, the rotating load arms 610 are provided with an opposition device 614, such as a sheave, to engage the zip line 608 opposite from the two main load-bearing sheaves 602, 602. The opposition sheave 614 is below the zip line 608 but forward of the main load arms 610 so that, upon deceleration the rotation of the load arms 610 brings the opposition sheave 614 into contact with the underside of the zip line 608. This effectively prevents the front load-bearing sheave 602 of the trolley from lifting during deceleration. In an embodiment, the opposition device 614 may be a free rolling sheave as shown, or a low friction surface. In an alternative embodiment, the opposition device 614 could be provided with a certain amount of braking resistance in order to provide extra braking when the deceleration forces are sufficient to cause the load arm to move enough to cause the opposition device 614 to engage the zip line 608. Again, although not shown in FIG. 6, a handle grip may be attached to the load arms 610, such as between the pivot and anchor point.

Figure 7:
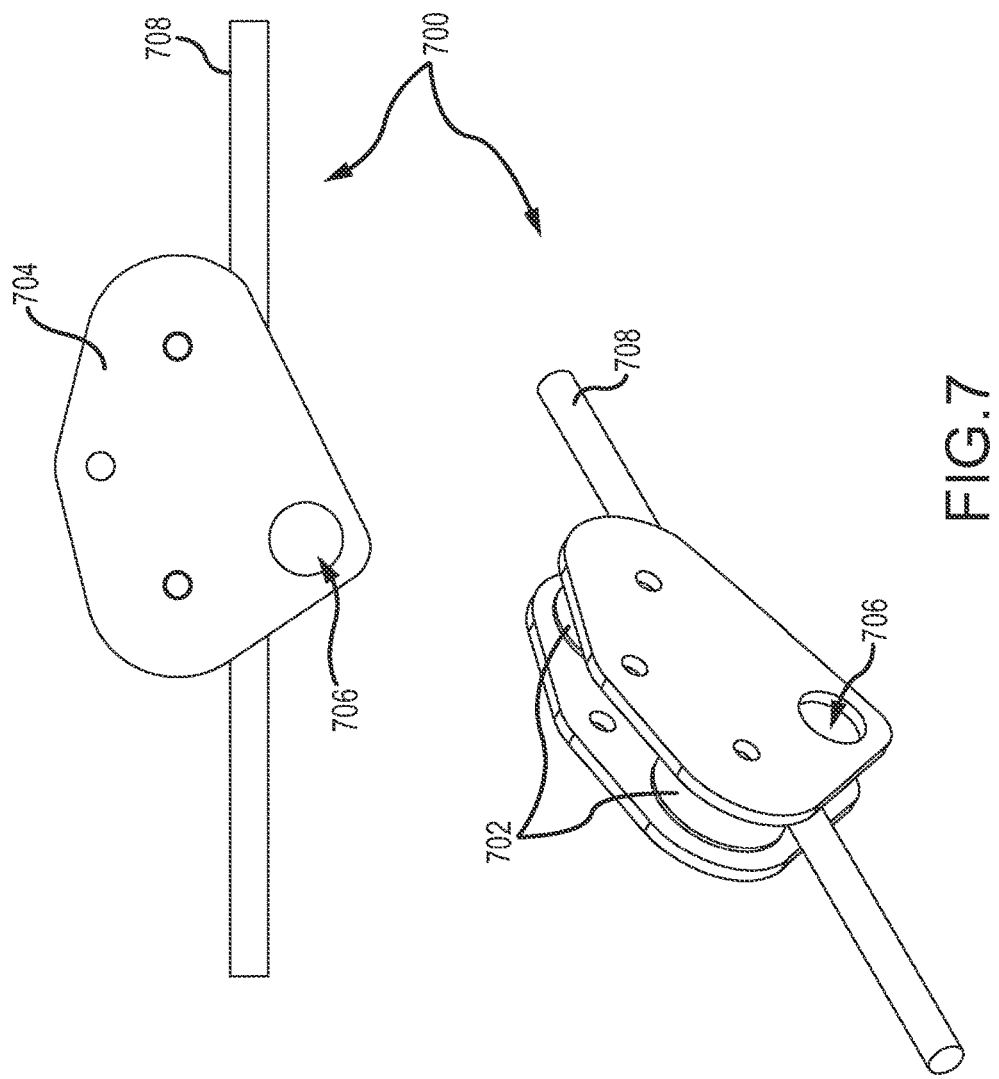
FIG. 7 illustrates an embodiment of an improved rider trolley with an offset anchor point.

FIG. 7 illustrates an embodiment of an improved rider trolley 700 with an offset anchor point 706. As discussed above existing trolley designs incorporate a load anchor or system that distributes the load equally between sheaves, which is problematic when lateral forces (such as impact braking forces) are exerted solely on the trolley (as opposed to on the payload). In the embodiment shown, the anchor point 706 of the rider trolley 700 remains below the zip line 708 when installed, but is positioned forward (that is, towards the direction of the travel) relative to the center of the trolley 700. The location, which distributes relatively more payload weight onto the forward sheave during normal operation, also reduces the moment on the rider trolley 700 created by deceleration caused by upon impact braking of the trolley 700.

Figure 8:
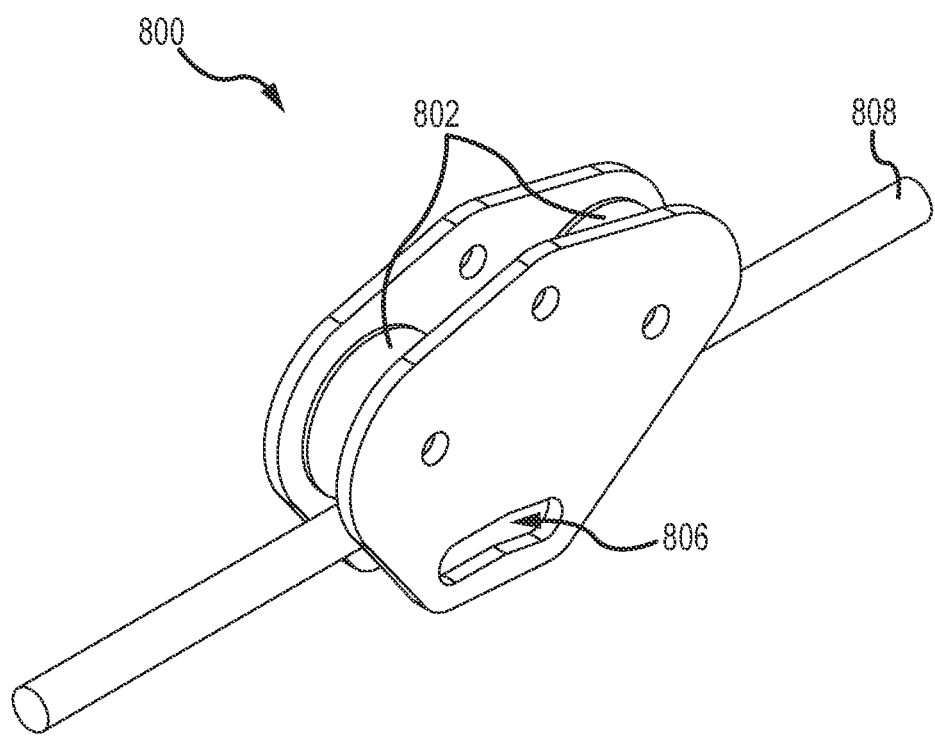
FIG. 8 illustrates an embodiment of an improved rider trolley with an angled slot as an anchor point.

FIG. 8 illustrates an embodiment of an improved rider trolley 800 with an angled slot as an anchor point. The anchor point 806 is an aperture shaped to allow for the anchor coupling to move upon deceleration of the rider trolley 800 relative to the location of the sheaves 802. The movement induced by the deceleration causes the anchor coupling to move relative to the forward sheave, thereby reducing the moment and changing the relative weight distribution on the two sheaves of the trolley 800, both of which reduce the overturning force on the trolley 800. In the embodiment shown, the anchor point 806 has an aperture shaped with a lowest point (relative to the sheaves) and a forward-angled ramp up to a higher point. In the embodiment shown, the lowest point is equidistant from the sheaves whereas the higher point is closer to or directly below the forward sheave. Thus, the load is initially well balanced between sheaves as the anchor coupling rests in the lowest point during descent. Impact braking resistance on the trolley 800 causes the anchor coupling to move forward because of the momentum of the payload, thereby redistributing the download load on the trolley 800 during deceleration so that more load is on the forward sheave during deceleration than is evident with the prior art trolley design.

Of course, the aperture illustrated in FIG. 8 is but one embodiment of a shape that could be used as anchor point 806 to cause a dynamic change in the position of the anchor coupling in response to trolley deceleration and other configurations are possible. For example, the lowest point and higher points could be located in different places on the trolley relative to the sheave than those shown to increase or decrease the dynamic effects on trolley load. For example, the aperture could be a linear or curved slot cut in the side plates, where gravity keeps the rider in one location until braking force is applied, thereby shifting it to the other side of the slot, (for example an upwardly slanting slot). The aperture could include multiple ramps of different angles or different regions with different shapes in order modulate the load based on deceleration forces.

In an alternative embodiment, the anchor point could incorporate a spring or other tensioning device to maintain the load centered during descent, but so that the impact braking force overrides the spring and allows the anchor coupling dynamically change to a position in which relatively more of the load is placed on the forward sheave. Any suitable tensioning technology could be used including mechanical springs, compressed air, or other type of tensioning system could be used. In yet another embodiment, the anchor point could include a dampener to reduce swing.

Figure 9:
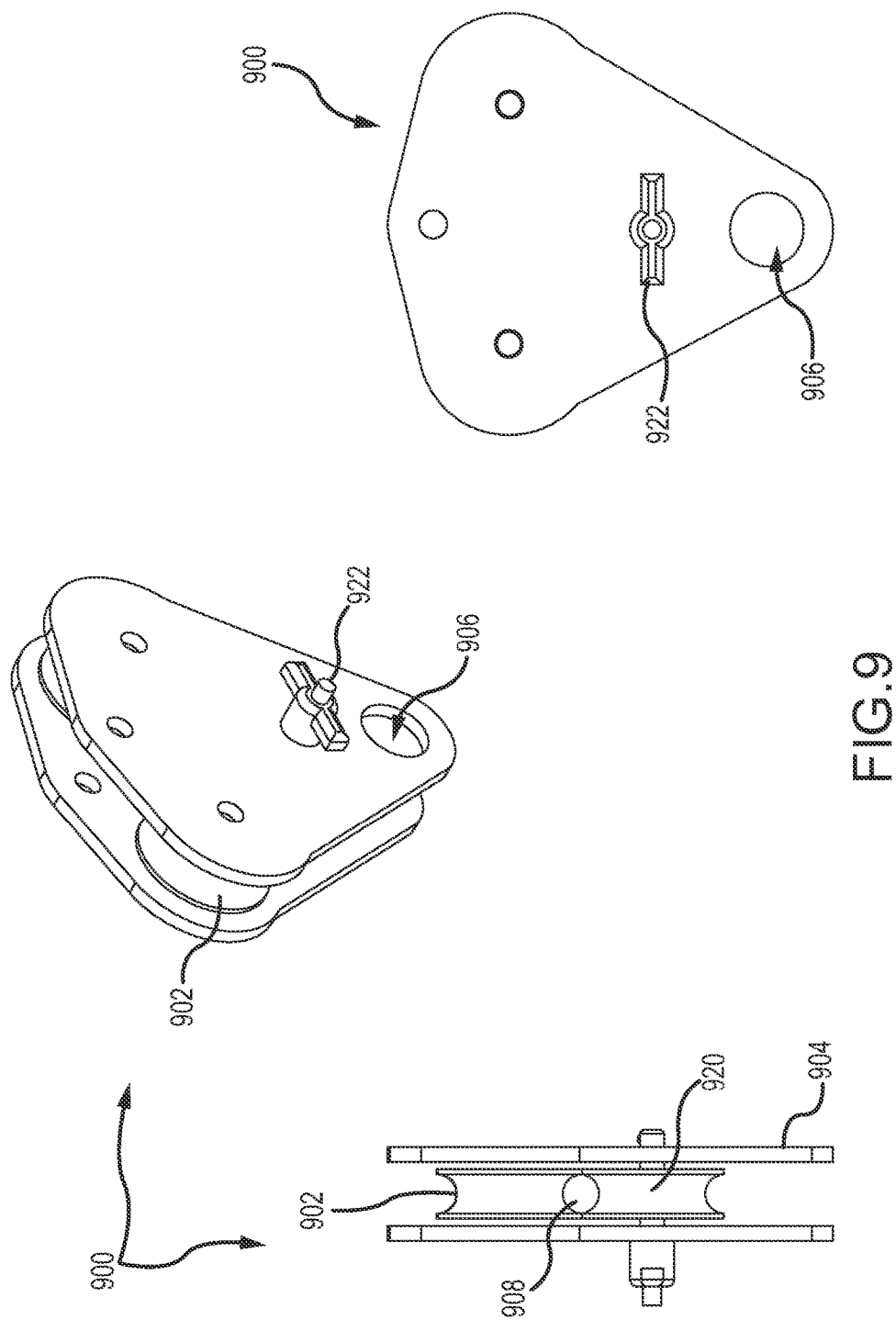
FIG. 9 illustrates an embodiment of an improved rider trolley with an opposition device that acts as a constraint upon the movement of the zip line relative to the opposed sheaves.

FIG. 9 illustrates an embodiment of an improved rider trolley 900 with some type of opposition device, e.g., a sheave, pin, carabiner, or other component, opposite the zip line 908 from the load-bearing sheaves 902 that acts as a constraint upon the movement of the zip line 908 relative to the sheaves. The opposition device 920 may be a low friction device such as a sheave as shown, bearing, or a low friction surface that physically prevents the sheaves from lifting off the line. Such an opposition device 920 could be small and need not be in contact with the zip line during normal descent, only coming in contact during deceleration of the trolley 900.

To accommodate a high throughput of riders, opposition devices 920 may be incorporated so that the trolley 900 may be easily installed and removed from the zip line 908 when not in active use. FIG. 9 illustrates an embodiment of an improved rider trolley 900 with a clevis pin 922 that allows the easy removal and attachment of the opposition device 920. In the embodiment shown, the pin 922 could be coupled to one of the side plates 904 by a cable, lanyard, tether or retention device (not shown). The rider trolley 900 is installed on the zip line 908 as normal, the opposition device 920 is then positioned and the clevis pin 922 is attached after installation.

In alternative embodiment of a simple opposition device-equipped rider trolley the opposition sheave would be attached to a hinged portion of a side plate on the trolley (not shown), and would be engaged when the hinged portion is flipped down. Once in position, a rider could be attached to both sides of the trolley, locking the opposition in place.

In yet another embodiment (not shown) of a simple opposition device-equipped rider trolley the opposition sheave or (low friction device) could be fixed in place, however the flanges of the lower (opposition) sheave(s) would have to be removed to allow the trolley to be installed on a cable. To accommodate this, the trolley side plate could have an opening to allow the cable to pass, provided that a gating method exists to ensure that the cable cannot be disconnected in operation.

In yet another embodiment (not shown) of a simple opposition device-equipped rider trolley the opposition sheave or (low friction device) could be fixed in place, however the flanges of the lower (opposition) sheave(s) would have to be removed to allow the trolley to be installed on a cable. To accommodate this, the trolley side plate could have an opening to allow the cable to pass, provided that a gating method exists to ensure that the cable cannot be disconnected in operations.

FIGS. 10-15 illustrate embodiments of an improved rider trolley with a slotted side plate allowing angled installation on a zip line or cable. The embodiments are further provided with an opposition device of some kind and, after installation on the zip line and attachment of the anchor coupling, the rider trolley cannot be removed from the zip line.

Figure 10:
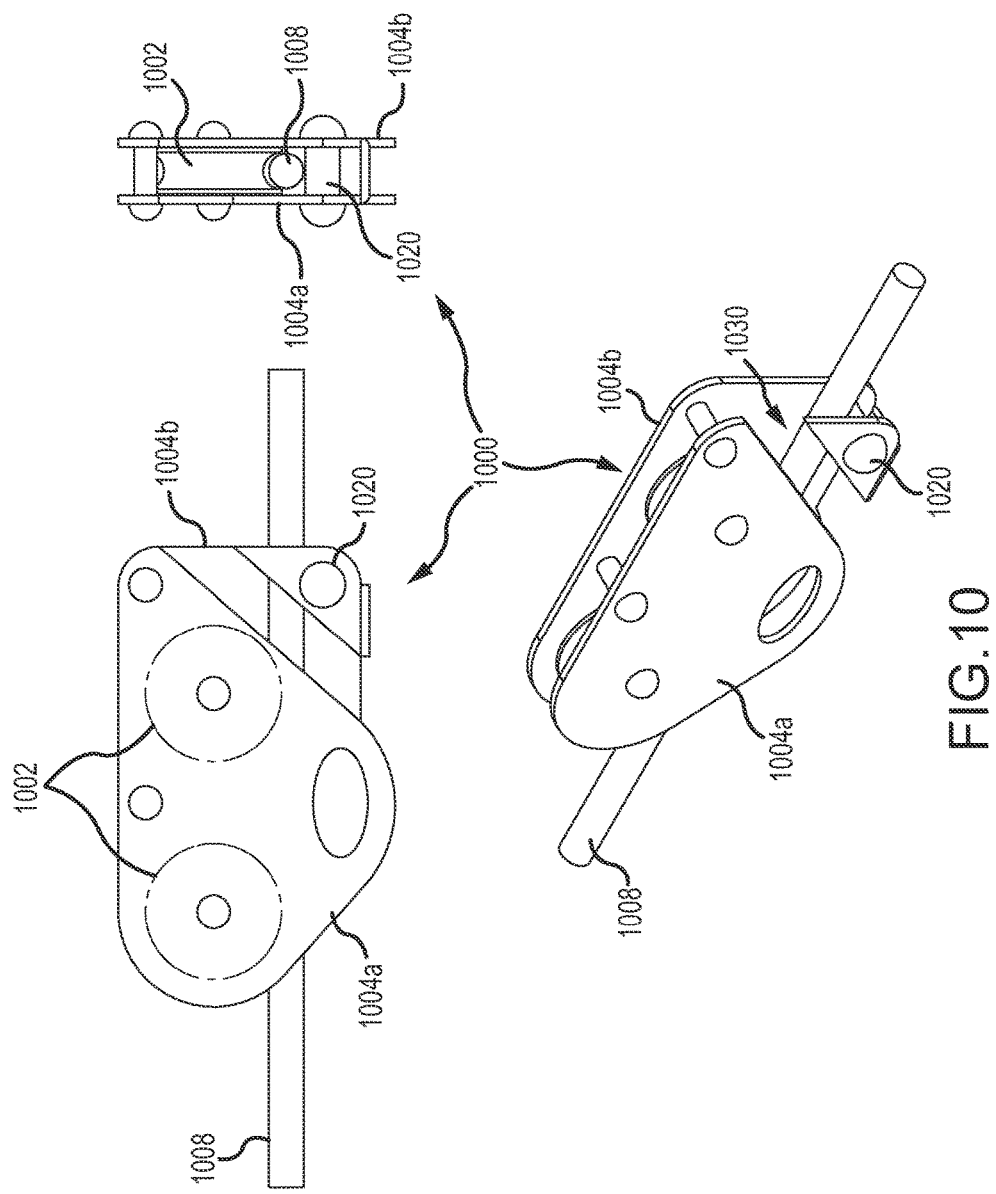
FIGS. 10-15 illustrate embodiments of an improved rider trolley with a slotted side plate allowing angled installation on a zip line or cable.
Figure 11:
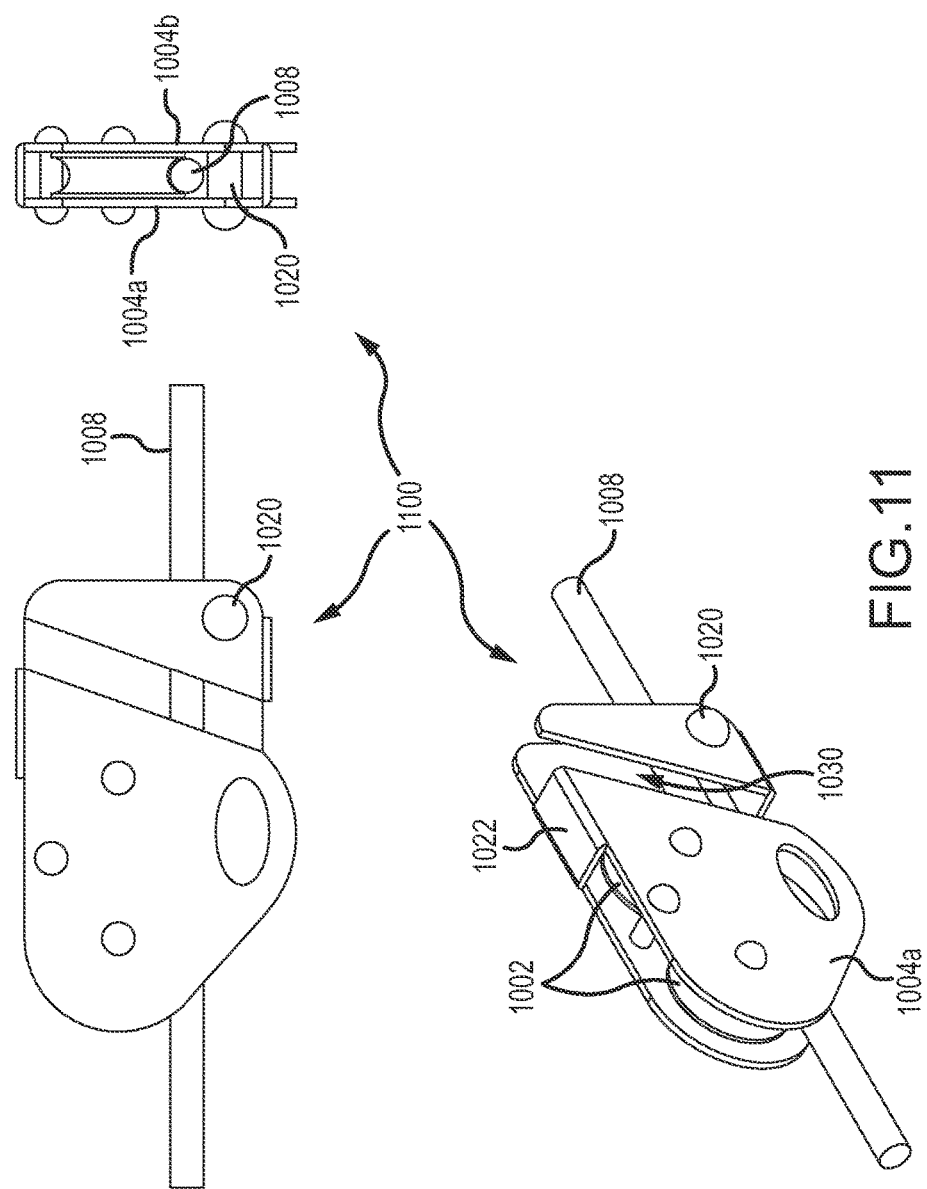

FIGS. 10 and 11 illustrate improved rider trolleys 1000, 1100, each with two load-bearing sheaves 1002 and a leading opposition sheave 1020. In the embodiments shown the right side plate 1004a (relative to the intended direction of travel) is provided with a gap 1030 that allows the trolley 1000, 1100 to be installed on the zip line 1008, although the line access slot 1030 could be provided in either side plate 1004a, 1004b. In the embodiments shown, a portion of the right side plate 1004a is a continuation of the left side plate 1004b that holds the opposition device 1020, which is a small sheave in this embodiment forward of the forward load-bearing sheave. In the trolley 1100, in FIG. 11, a structural support 1022 is provided between the side plates 1004a, 1004b.

Figure 12:
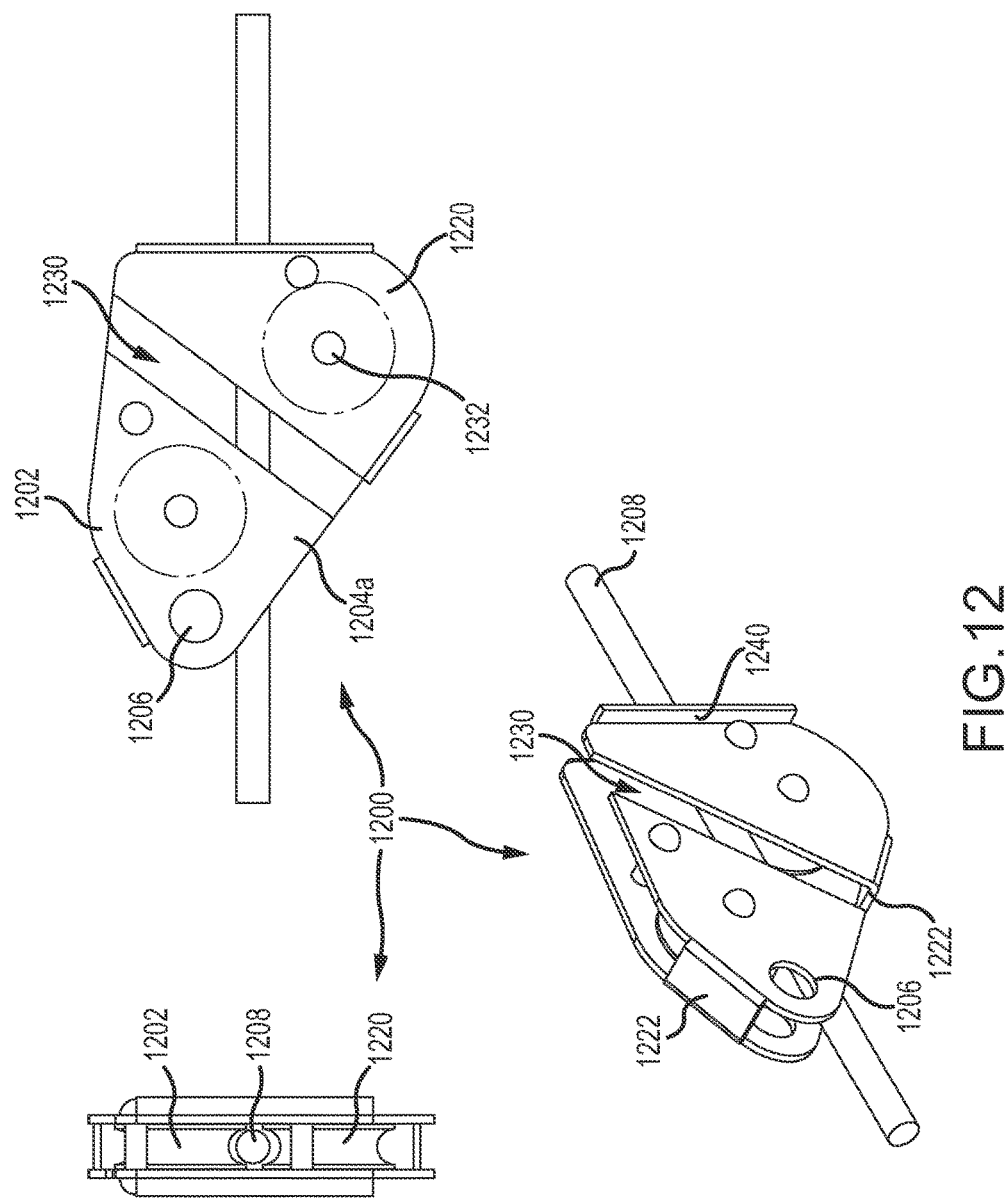

FIGS. 12-15 illustrate alternative embodiments of an improved rider trolley with a slotted side plate having a single, upper, load-bearing sheave above the zip-line and a counter-balancing, lower, load-bearing sheave below the zip line. In FIG. 12, as in the previous embodiments the rider trolley 1200 is installed on the zip line 1208 by passing the zip line through the slot 1230 in the side plate 1204a and then rotating the trolley so that the upper and lower sheaves 1202, 1220 engage the zip line 1208.

The anchor point 1206 in the trolley is rearward of the upper sheave 1202 and above the zip line 1208 so that when loaded with a payload the lower sheave 1220 is also loaded with an upward force against the zip line 1208. The relative distance between the anchor point 1206 and the two sheaves 1202, 1220 can be varied to distribute the load between the sheaves. For example, in the embodiment shown in FIG. 12, the configuration shown results in approximately 5/3 of the payload weight as a downward force on the upper sheave 1202 and an upward force of 2/3 of the payload weight on the lower sheave 1220. In this way, the load may be allocated in any manner desired by the manufacturer in order to keep the sheaves engaged with the zipline during operation.

In an embodiment the anchor coupling (not shown), after it is attached around the zip line 1208 and through the anchor point 1206, constrains the movement of the trolley 1200 relative to the zip line 1208 such that the rider trolley 1200 cannot be removed from the zip line 1208. The geometry of this trolley design is such that upon impact braking the braking forces on the trolley substantially prevent the forward sheave from lifting from the zip line. The anchor point may be slightly lower than the axle of the upper sheave, relative to the zip line when installed, or at the same level.

The trolley 1200 of FIG. 12 is further provided with an impact flange 1240 on the forward surface of the trolley

1200. As illustrated, support structures 1222 may be used to connect the various portions of the side plates.

In yet another embodiment (not shown) the side plate is extended and the anchor point is placed so that, when installed, the anchor point is below the zip line but still rearward of the upper sheave. In this embodiment, the anchor coupling when installed does not encompass the zip line 1208 but still prevents the trolley 1200 from being removed from the zip line 1208 in the same manner as described with respect to FIG. 7.

Figure 13:
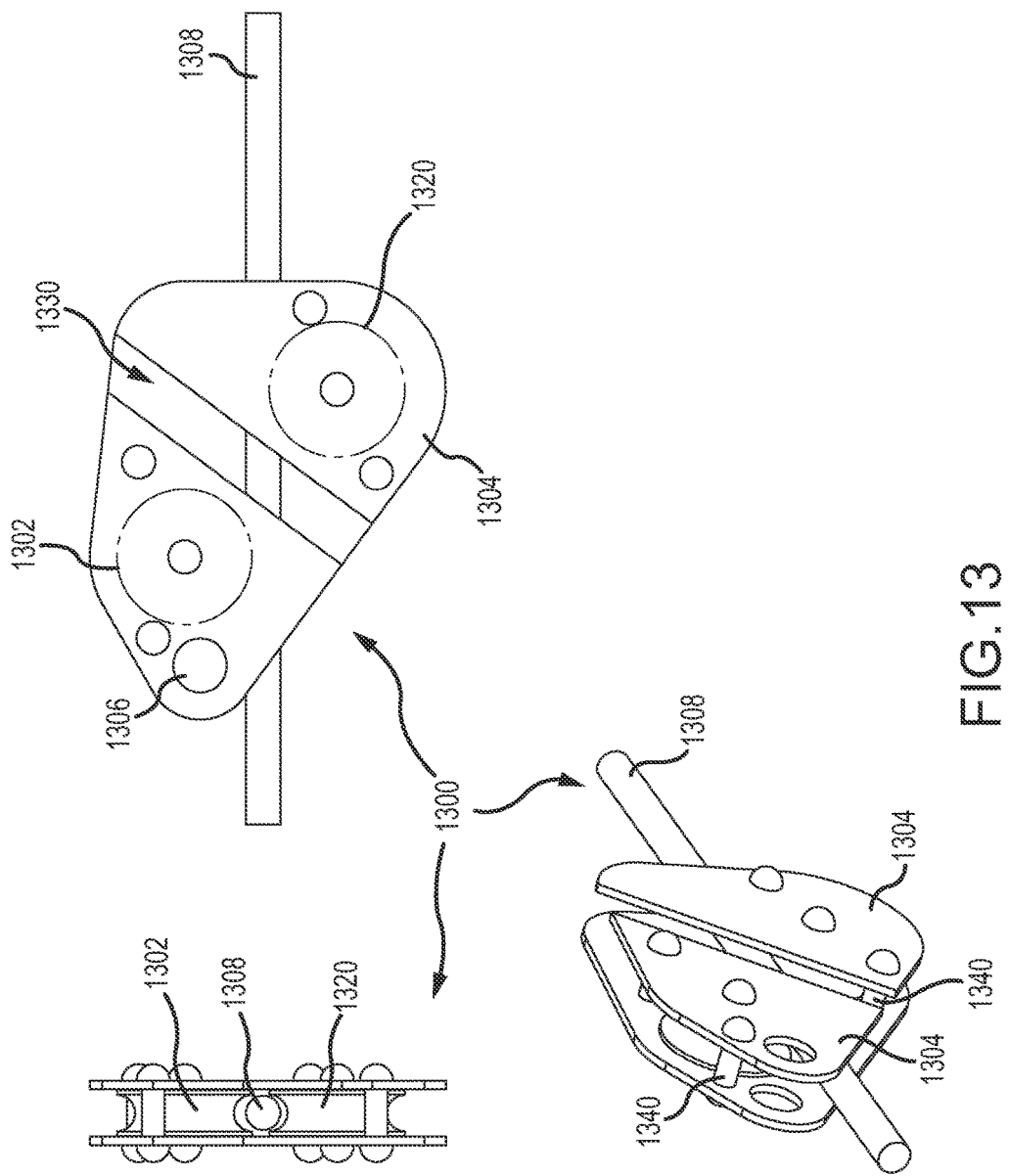

FIG. 13 illustrates a second embodiment of a rider trolley 1300 with a slotted side plate 1304 having a single load-bearing sheave 1302 above the zip-line 1308 and a counter-balancing, load-bearing sheave 1320 below the zip line. This embodiment has a slightly modified slot 1330 configuration and different side plate structural supports 1340, among other things as shown in the FIG.

Figure 14:
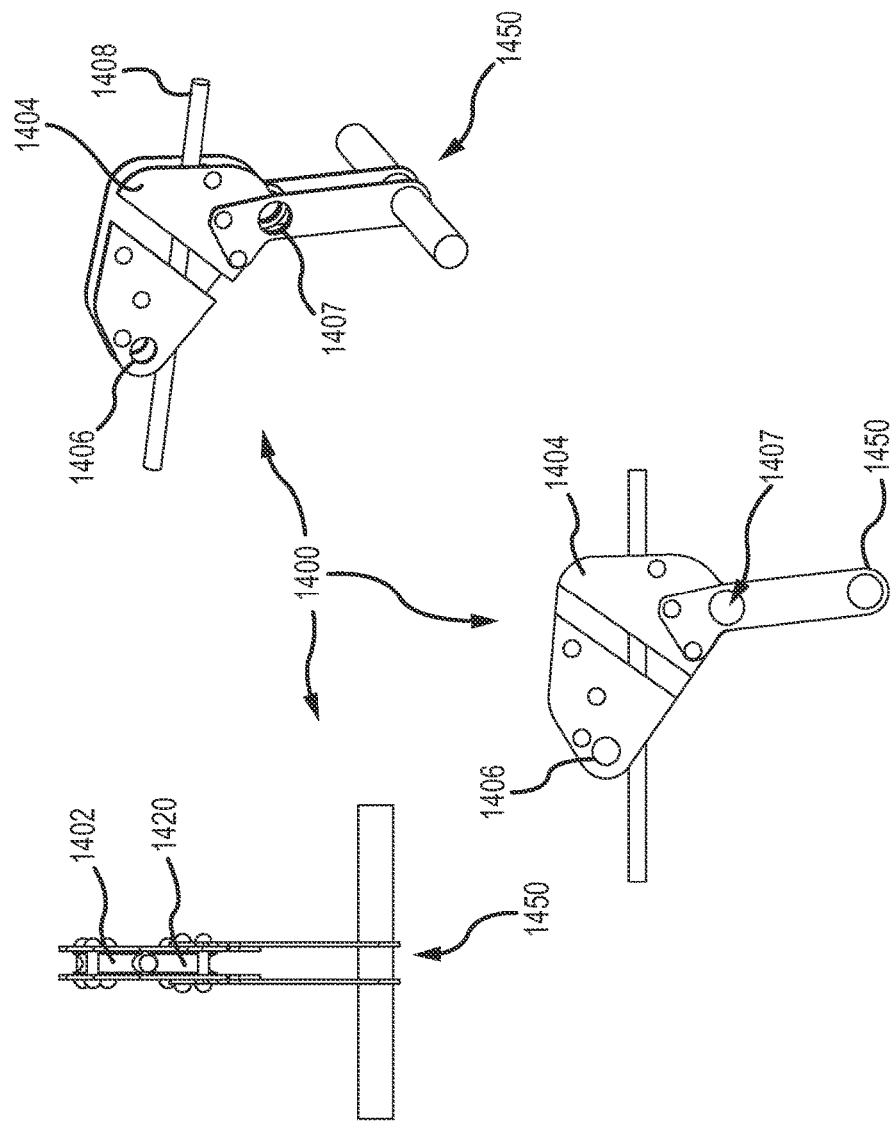

FIG. 14 illustrates an embodiment of a rider trolley 1400 with a slotted side plate 1404 having a single load-bearing sheave above the zip-line 1408 and a counter-balancing, load-bearing sheave 1420 below the zip line, further provided with a T-handle 1450 for use by a rider. In the embodiment shown, the T-handle 1450 is attached adjacent to the lower load-bearing sheave 1420. The T-handle 1450 may be fixed to the trolley 1400 (as shown) or may be provided with a rotating pivot in order to allow some swing to the T-handle. In the embodiment shown, in addition to the anchor point 1406 a secondary anchor point 1407 may be provided on the trolley as shown or at another location on the trolley 1400 or T-handle arm.

Figure 15:
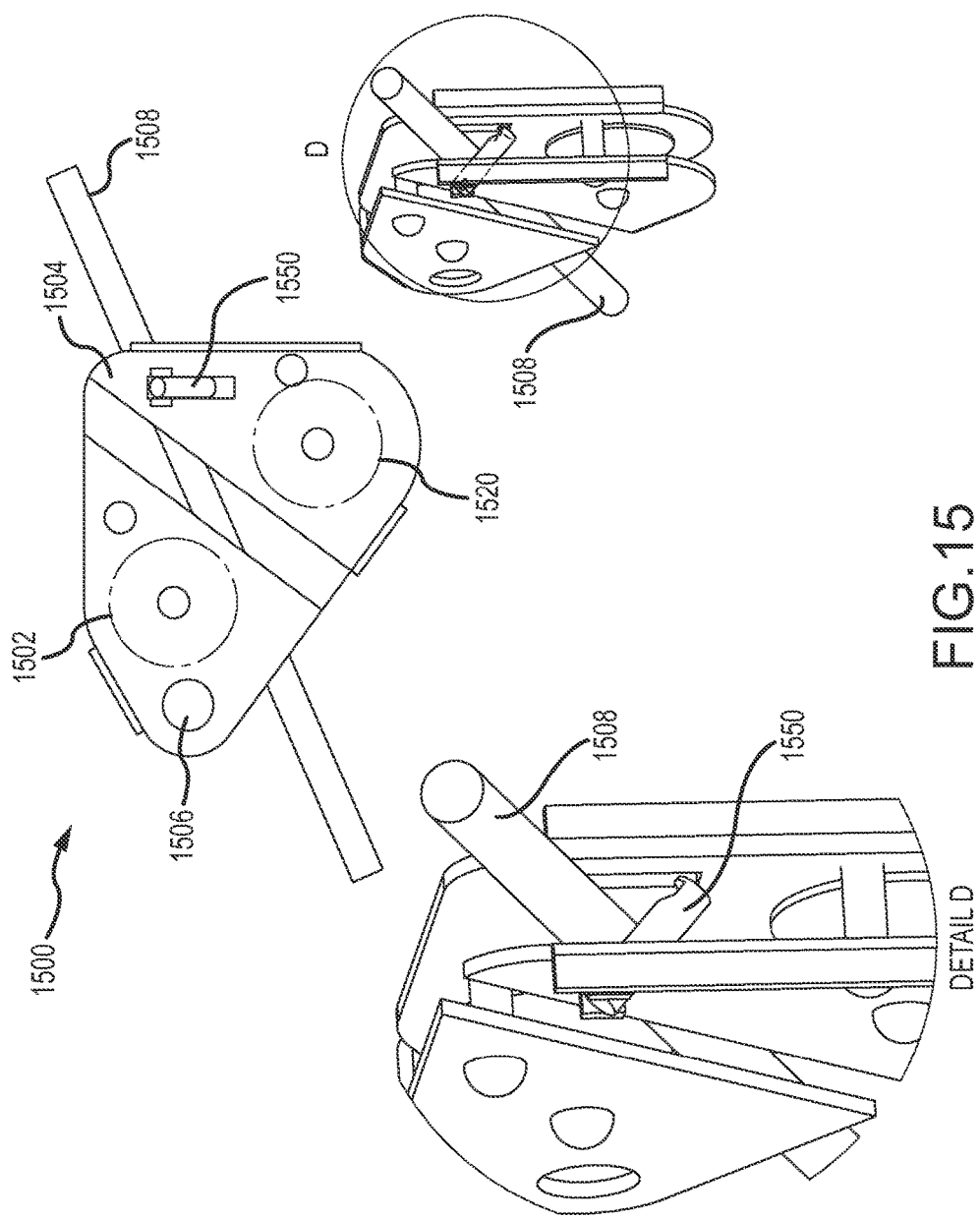
Figure 16A:
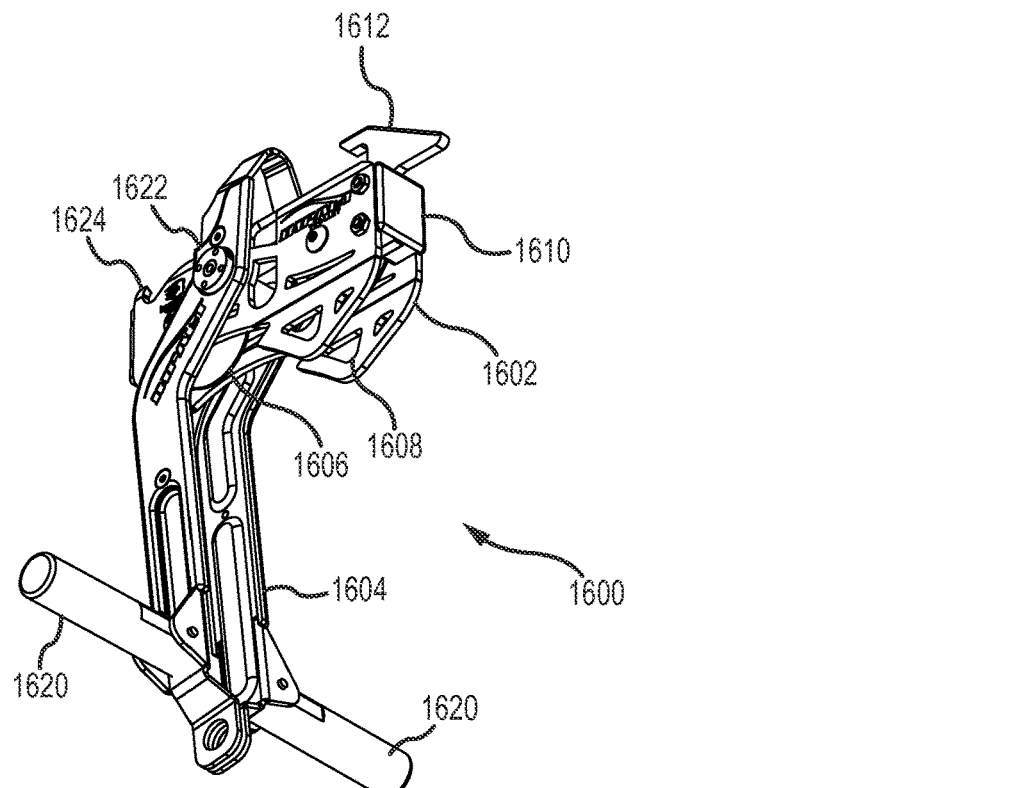
FIGS. 16A-D illustrates another embodiment of a rider trolley with a pivoting handle.
Figure 16B:
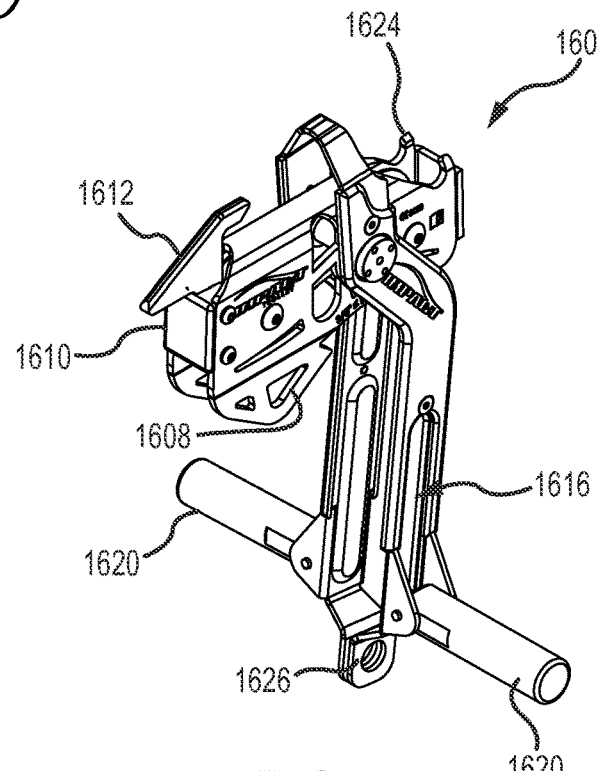
Figures 16C, 16D:
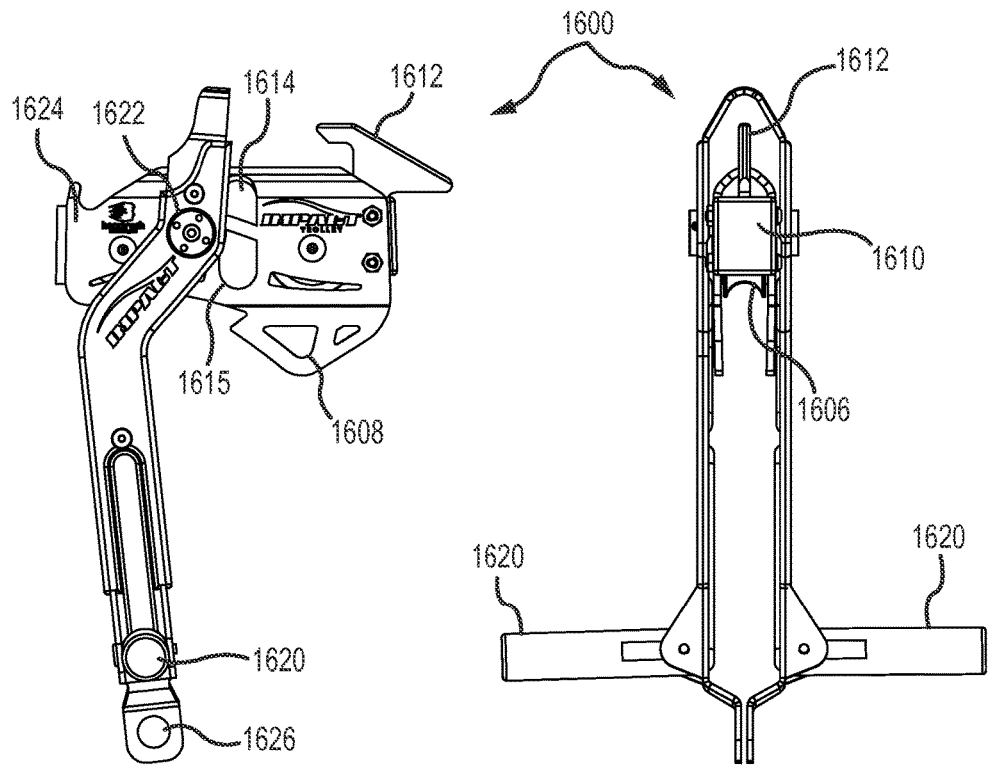
Figures 17A, 17B:
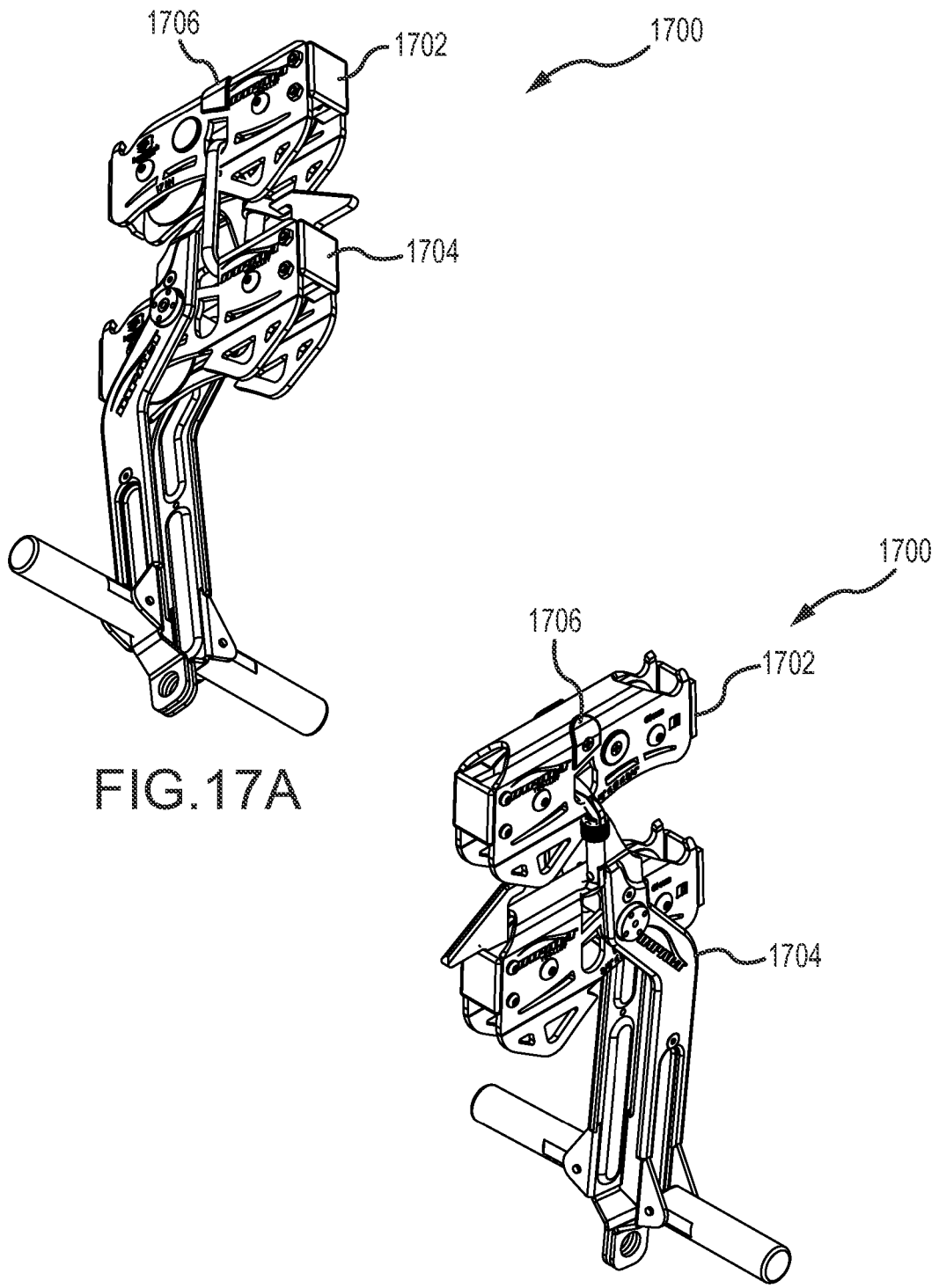
FIGS. 17A-D illustrate an embodiment of a dual trolley configuration for use with a dual (upper and lower) zip line system.
Figures 17C, 17D:
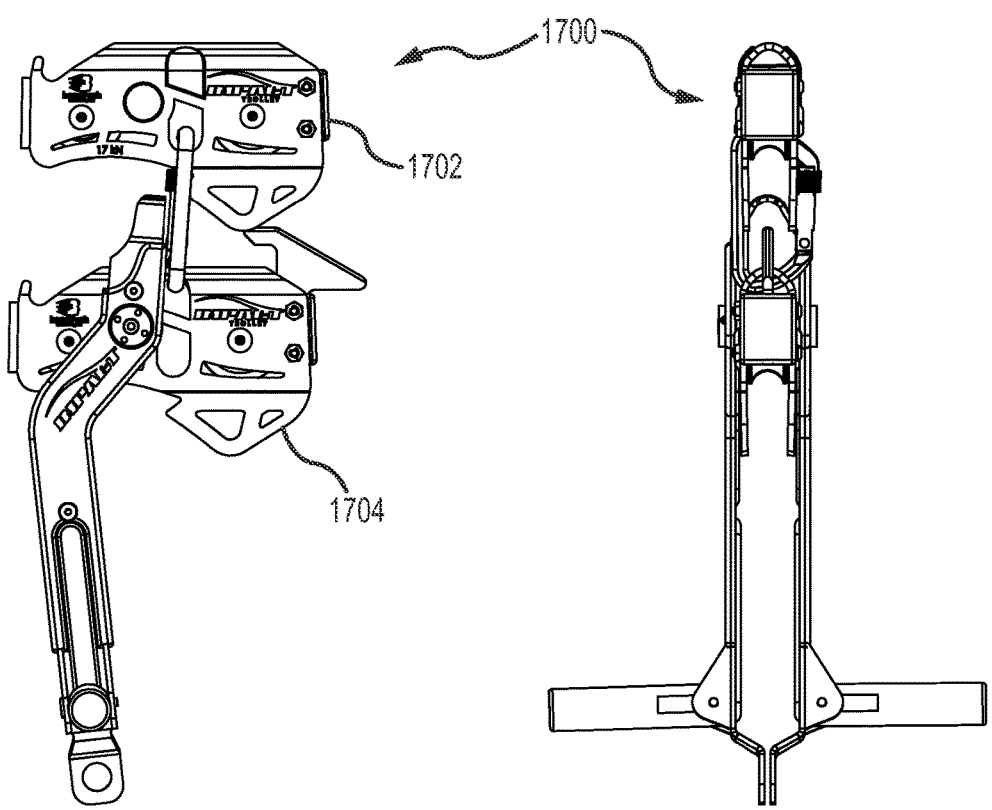

FIG. 15 illustrates an embodiment of a rider trolley 1500 with a slotted side plate 1504 having a single load-bearing sheave 1502 above the zip-line 1508 and a counter-balancing, load-bearing sheave 1520 below the zip line, further provided with secondary safety mechanism 1550 for retaining the trolley 1500 on the zip line after installation. As discussed above, the primary safety mechanism on the rider trolley 1500 is the anchor coupling which prevents the zip line 1508 and trolley 1500 from being separated after installation. In the embodiment shown, a secondary safety mechanism 1550 is provided for additional safety.

The secondary mechanism 1550 in FIG. 15 is a spring-loaded latch that automatically engages upon installation of the trolley 1500 on the zip line 1508. Proper installation requires pressing the zip line 1508 against the latch as shown. The latch 1550 moves in response to the pressure and allows the zip line 1508 to pass to engage the lower sheave 1520. The spring mechanism then forces the latch 1550 back into position, effectively constraining the zip line between the latch, side plates, and the sheaves until manually released by a user. This is but one example of a secondary safety mechanism 1550 and any suitable mechanism (e.g., the clevis pin previously discussed or a secondary anchor point provided to allow a carabiner or other coupling to be used to constrain the movement of the zip line) may be used.

FIGS. 16A-D illustrates another embodiment of a rider trolley with a pivoting handle. In the embodiment 1600 shown, a trolley portion 1602 is pivotably attached to a handle and arm assembly 1604. The rider trolley 1602 is illustrated as having two sheaves 1606 in a trolley housing that includes side plates and anchor points 1608, as well as other components discussed in greater detail above. The housing may be made of any suitable material such as metal, carbon fiber or plastic. The housing may further be painted or anodized to improve the appearance or to provide protection against wear or the elements.

The housing is further provided with an impact surface 1610. A bumper or other shock absorbing device (not shown) may be attached to the impact surface 1610 to provide for a softer impact on the brake. The impact surface 1610 provides a greater surface area for engagement with the brake, which decreases the wear on both the brake and the trolley 1600. Furthermore, by placing the impact surface near the zip line, the location reduces the moment induced on the trolley by the impact.

Various portions of the side plates have been removed for weight savings but also for providing additional attachment points. For example, an upper anchor point 1614 and a lower central anchor point 1615 are provided in addition to the main anchor points 1608 below the leading sheave. These will be discussed with greater detail in reference to FIGS. 17A-D.

In addition, the housing is provided with a catch 1612 for engaging a brake (not shown). In the embodiment shown, the catch 1612 includes a forward ramp portion and a rearward facing engagement hook portion. In operation, as the trolley approaches a brake provided with a catch bar, the forward ramp portion deflects the bar on the brake device up until the bar passes completely over the catch 1612. The bar then falls behind the catch 1612. At this point, any rearward movement of the trolley relative to the brake is prevented as the brake bar is captured by the hook portion, effective attaching the trolley 1600 to the brake device until an operator manually disengages the brake bar. The fact that the catch is essentially in the form of a thin sheet of material with the ramp and hook portions allows for the trolley to engage with a brake bar throughout a range of entry angles (relative to the zip line). For example, under cross wind conditions a rider may not be directly under a zip line when arriving at the landing platform and the trolley 1600 may, therefore, not be vertically oriented upon impact with the brake. The configuration shown allows the bar to still engage the catch 1612. In addition, this configuration allows for a brake to oriented at an angle relative to vertical and still operate with vertically landing trolleys, providing additional flexibility to zip line operator in setting up the system.

Another feature of the trolley embodiment illustrated in the FIGS. 16A-D is a secondary hook point 1626 located at the rear of each side plate the trolley 1600. In an alternate embodiment, the secondary hook point 1626 may be provided on only one side plate or may be incorporated into a structure that connects the two side plates. The secondary hook point 1626 provides a location for connection to a secondary safety line or to a launcher apparatus. By using a hook instead of an aperture, engagement and disengagement is easy and quick.

FIGS. 16A-D illustrate several details about the handle and arm assembly 1604. The assembly 1604 includes two folding handles 1620. The handles 1620 are allowed to pivot roughly 90 degrees between a storage position (not shown) against their associated arm and an operational position in which the handle is roughly perpendicular to the arms (illustrated). In the embodiment shown, the arms are provided with recessed portions 1616 for accepting the handle 1620 when it is in the storage position. Any handle configuration may be used and other handle embodiments are possible. For example, the handle may be fixed in the operational position instead of being foldable.

The handle and arm assembly 1604 is illustrated as having two connected arms that are connected to a pivot 1622 on the trolley 1600 located between the two sheaves. The entire assembly 1604 can rotate freely about the pivot 1622 in response to external forces acting on the arm. Because the arms are connected above the trolley 1600 there is a limit to the amount of rotation that is possible due to the upper portion of the arms contacting the trolley. In the embodiment shown, the movement is limited to about 75 degrees, that is, the lower portion can rotate 75 degrees forward and up before the upper portion contacts the trolley. Different designs could be used to increase or decrease the possible amount of movement.

The handle and arm assembly 1604 is also illustrated with arm anchor points 1626 in the arms below the handles 1620. The handle and arm assembly 1604 is fully redundant and captures the zip line completely when an anchor coupling is using in the arm anchor point 1626. In operation, a payload could be anchored to any or all anchor points on the trolley 1600. For example, in one embodiment riders may be connected to the primary anchor points 1608 in the trolley but also provided a secondary, redundant connection to the arm anchor points 1626 in case the connection to the primary anchor points 1608 fails.

The handle and arm assembly 1604 is illustrated with a "jog" or dog leg shape in the arms when viewed from the side. This allows the assembly 1604 to clear a carabiner in the primary trolley anchor points 1608 during pivoting motion. It also increases the amount of forward rotation of the handles.

The length of the handle and arm assembly 1604 is selected based on a number of potentially competing factors including: a) to keep the rider hands and appendages away from the trolley 1600 and zip line; b) convenient size and weight for carrying; and c) allows for the appropriate pivoting angle.

The various attachment points (e.g., upper and lower central anchor points 1614, 1615, primary trolley anchor points 1608, arm anchor points 1626), when provided as apertures, may be sized to fit all common carabiners. Any or all of the points may be shaped to prevent a carabiner from sliding forward during impact braking. Alternately, as described in greater detail above, any or all points may be shaped specifically to cause a carabiner to move, and thus to redistribute the load on the trolley sheaves, in response to impact braking. The points may be provided with rounded sections specifically for retaining a carabiner at a specific location within a larger aperture. In the embodiment shown in FIGS. 17A-D, the primary trolley anchor points 1608 are located off center, closer to the front sheave to distribute the majority of the rider weight on the front sheave. During impact braking, this reduces the likelihood that the sheaves will lift from the zip line during impact braking.

FIGS. 17A-D illustrate an embodiment of a dual trolley configuration for use with a dual (upper and lower) zip line system. In the embodiment shown, an upper trolley 1702 is installed on the upper zip line and a lower trolley 1704 is installed on the lower zip line (the zip lines are not shown). In the embodiment shown, the lower trolley 1704 is the same as that illustrated in FIGS. 16A-D. The upper trolley 1702 has the same trolley portion 1602 as described with reference to FIGS. 16A-D with the exception that it is not provided with a handle and arm assembly or with a catch for engaging a brake. The two trolleys 1702, 1704 are connected via a locking carabiner clipped through the lower central anchor point 1615 in the upper trolley 1702 and the upper anchor point 1614 in the lower trolley 1704.

Another difference in the upper trolley 1702 and that shown in FIGS. 16A-D is the use of a protective cover 1706 in the upper anchor point 1614. In the embodiment shown, in the dual configuration the upper anchor point 1614 in the upper trolley 1702 is not needed. The cover 1706 is used to prevent anything from getting caught in the upper anchor point 1614 during use. Such a protective cover could be used to close any aperture on any trolley if it is determined that such aperture is not needed at any given time. For example, a cover (not shown) could be provided for the lower central anchor point 1615 in the lower trolley 1704 in the configuration shown for added safety.

It will be immediately recognized that alternate dual trolley configurations are possible in which different trolleys or trolleys with different components are used for the upper and lower zip lines. For example, the upper trolley 1702 could be provided with the catch 1612 instead of or in addition to having a catch 1612 on the lower trolley 1704. Other confirmations will be immediately suggested to those in the art and any such configuration is within the scope of this disclosure.

It will be clear that the technologies described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope of the present invention. For example, a bumper or other impact plate may be provided on any of the rider trolley embodiments shown. Instructions concerning proper installation may be etched in the side plates including an identification of the proper direction of movement of the trolley on the zip line. Secondary safety mechanisms may be incorporated in any and all embodiments shown as desired. Numerous other changes may be made which will readily suggest themselves to those skilled in the art and which are encompassed in the spirit of the disclosure.

In addition, although described in terms of zip line trolleys, the trolleys described herein could be adapted for conveying loads from one location to another via any type of structural members, such as rope, cable, track, I-beam, tube steel, rail, or steel bar. In such embodiments, the trolleys are adapted as described above to prevent the trolleys from undesired rotation relative to the structural member that could cause one or more sheaves or other riding surfaces from disengaging from the structural member.

What is claimed is:

1. A trolley for traversing a cable in a first direction, comprising:
    a first sheave rotatably mounted to one or more side plates;
    a second sheave rotatably mounted to the one or more side plates and rearward of the first sheave relative to the first direction;
    a single anchor point in at least one of the one or more side plates for attaching a payload, wherein the anchor point is formed as an aperture defined at least partially within at least one of the one or more side plates beneath the first sheave and below the cable when the trolley is installed so that weight of the payload is predominantly borne by the first sheave from the single anchor point; and
    a handle and arm assembly mounted to the one or more side plates at a pivot located between the first sheave and the second sheave and above the cable when the trolley is installed, wherein the handle and arm assembly is freely rotatable about the pivot.

2. The trolley of claim 1 further comprising:
at least one hook on an upper surface of the trolley and located forward of the first sheave.

3. The trolley of claim 2, wherein the at least one hook is adapted to connect to a launch mechanism.

4. The trolley of claim 2, wherein the at least one hook comprises a first hook located forward of the first sheave and a second hook located rearward of the second sheave.

5. The trolley of claim 1, wherein the first sheave and the second sheave are rotatably mounted between two side plates and the trolley further comprises:
at least one impact surface on the trolley between the two side plates and forward of the first sheave adapted to impact a brake when traveling in the first direction.

6. The trolley of claim 1 further comprising a catch adapted to engage a brake when the trolley is decelerating, the catch comprising:
a forward ramp portion adapted to deflect a brake bar; and
a rearward facing hook portion adapted to engage a brake bar.

7. The trolley of claim 1 further comprising at least one trolley anchor point located on at least one of the one or more side plates between the first sheave and the second sheave and above the cable when the trolley is installed.

8. The trolley of claim 1 further comprising a catch on an upper surface of the trolley and located forward of the first sheave, the catch is adapted to engage a brake when the trolley is decelerating.

* * * * *